| United States Patent [19] | [11] Patent Number: 5,056,630 |
|---|---|
| Fujii et al. | [45] Date of Patent: Oct. 15, 1991 |

[54] WHEEL RIM FOR A BICYCLE

[75] Inventors: Yoshihiko Fujii, Tokorozawa; Bunji Mutoh, Kodaira; Yoshitaka Tamura, Saitama; Kiyofumi Hirai, Ageo, all of Japan

[73] Assignees: Bridgestone Corporation; Bridgestone Cycle Co., Ltd., both of Tokyo, Japan

[21] Appl. No.: 320,823

[22] Filed: Mar. 7, 1989

Related U.S. Application Data

[63] Continuation of Ser. No. 50,253, May 13, 1987, abandoned.

[30] Foreign Application Priority Data

May 27, 1986 [JP] Japan .................................. 61-121839
Jun. 25, 1986 [JP] Japan .................................. 61-148500

[51] Int. Cl.⁵ .......................... F16D 49/00; B22F 7/00
[52] U.S. Cl. .......................... 188/24.13; 188/218 XL; 301/95; 301/6 R
[58] Field of Search ............... 301/55, 95, 96, 105 B, 301/6 R, 6 V, 6 WB; 188/251 A, 251 M, 218 XL, 24.11, 24.12, 24.13, 251 R, 251 XL; 428/937; 106/14.05

[56] References Cited

U.S. PATENT DOCUMENTS

| 2,938,790 | 5/1960 | Stedman et al. | 188/218 XL |
|---|---|---|---|
| 3,197,291 | 7/1965 | Michael | 428/937 |
| 3,433,327 | 6/1967 | Regis | 188/218 XL |
| 3,623,577 | 11/1971 | Scharlack | 188/218 XL |
| 3,732,951 | 5/1973 | Hata et al. | 188/24.13 |
| 4,011,055 | 3/1977 | Hill et al. | 188/251 A |
| 4,146,654 | 3/1979 | Guyonnet . | |
| 4,189,424 | 2/1980 | Takamatsu | 188/24.11 |
| 4,290,510 | 9/1981 | Warren | 188/218 XL |
| 4,351,885 | 9/1982 | Depoisier et al. | 188/251 M |
| 4,470,483 | 9/1984 | Holtz | 188/24.11 |
| 4,525,213 | 6/1985 | Linn | 106/14.05 |
| 4,531,754 | 7/1985 | Engleman | 301/95 |

FOREIGN PATENT DOCUMENTS

353493 4/1905 France .
921461 5/1947 France .
2003935 3/1979 United Kingdom .

*Primary Examiner*—Johnny D. Cherry
*Assistant Examiner*—Joseph D. Pape
*Attorney, Agent, or Firm*—Kanesaka and Takeuchi

[57] ABSTRACT

A wheel rim for a two-wheeled vehicle has a spray coated metallic and/or ceramic layer covering at least a part of a rim surface with which a brake shoe is brought into contact when a brake is applied.

5 Claims, 2 Drawing Sheets

WHEEL RIM FOR A BICYCLE

This application is a continuation of application Ser. No. 07/050,253, filed May 13, 1987 now abandoned.

BACKGROUND OF THE INVENTION

1. Field of the Invention:

This invention relates to the rims of wheels for a two-wheeled vehicle.

2. Description of the Prior Art:

A two-wheeled vehicle, such as a bicycle or a motor bicycle, is usually provided with a braking system including a brake shoe which can be pressed against a wheel rim for stopping the rotation of a wheel by friction. Its braking performance largely depends on the coefficient of friction between the material from which the rim is formed, such as an aluminum alloy, and the rubber from which the brake shoe is formed. This coefficient of friction becomes lower if the rim or the brake shoe is wetted with rain, etc. As a result, the braking system fails to function satisfactorily.

Various attempts have been made to obtain, even if they are wet, an improved coefficient of friction which is close to the value which can be achieved when they are dry. They include (1) roughening the surface of the rim, (2) employing a brake show having a specially shaped sliding surface on which no film of water is formed, and (3) forming the brake shoe from an appropriately selected material which can be expected to give a satisfactorily high coefficient of friction even if it may be wet.

All of these attempts are, however, unacceptable. The method as stated at (1) above requires a machining job which needs a great deal of time and labor. Nevertheless, no effect can be expected to last for a long period of time, as the rim recovers a smooth surface in a relatively short time as a result of wear. The methods as stated at (2) and (3) are both supposed to employ a rim having a smooth surface. Therefore, a film of water is likely to be formed between the sliding surfaces of the rim and the brake shoe and cause a hydroplaning phenomenon.

SUMMARY OF THE INVENTION

It is, therefore, an object of this invention to provide a wheel rim for a two-wheeled vehicle which can easily and reliably achieve a sufficiently high coefficient of friction to ensure the effective performance of a braking system even if it may be wet on a rainy day, or on any other occasion.

It is another object of this invention to provide a wheel rim for a two-wheeled vehicle which can be manufactured at a low cost.

It is still another object of this invention to provide a wheel rim for a two-wheeled vehicle which has a highly durable treated surface.

These objects are essentially attained by a rim which has a surface contacting a brake shoe, and which is at least partly covered with a spray coated metal and/or ceramic layer.

Other features and advantages of this invention will become apparent from the following detailed description and the accompanying drawings.

DETAILED DESCRIPTION OF THE INVENTION

Figure 1:
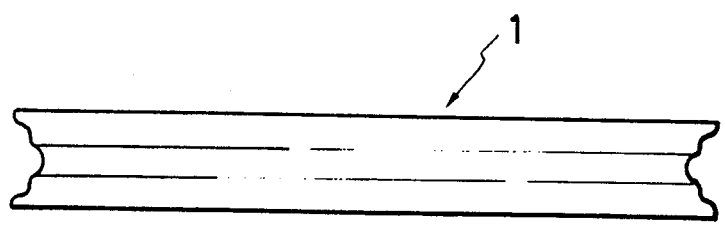
FIG. 1 is a side elevational view of a wheel rim embodying this invention.
Figure 2:
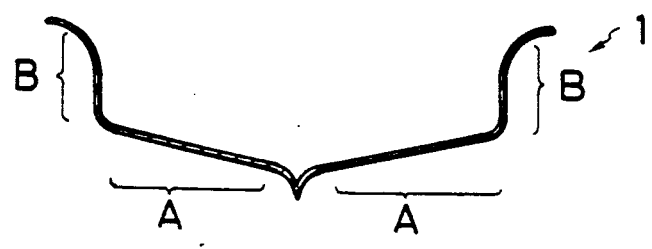
FIG. 2 is an enlarged cross sectional view of the rim embodying this invention.
Figure 3:
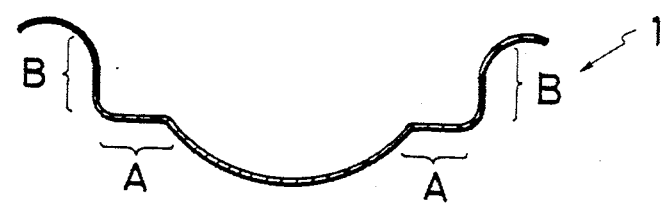
FIG. 3 is a view similar to FIG. 2, but showing another embodiment of this invention.
Figure 4:
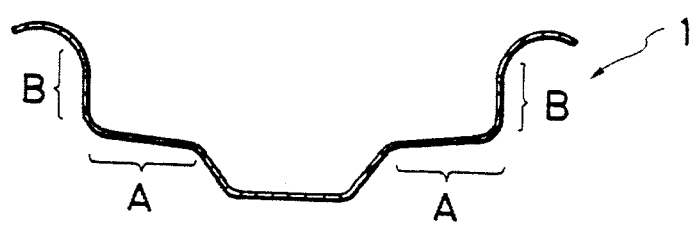
FIG. 4 is a view similar to FIG. 2, but showing still another embodiment.

According to this invention, a spray coated metal and/or ceramic layer is formed on at least a part of that surface of a rim with which a brake shoe is brought into contact. There is no particular limitation to the side elevational or cross sectional configuration of the rim to which this invention is applicable. FIG. 1 shows by way of example the side elevation of a rim 1 embodying this invention. Some cross sectional configurations are shown by way of example in FIGS. 2 to 4. FIG. 2 shows a, say, split rim, FIG. 3 shows a WM type deep-bottomed rim and FIG. 4 shows an MT type deep-bottomed rim. There is no particular limitation, either, to the material which can be employed for making the rim of this invention. It is possible to use any of the metals which are usually employed for making wheel rims for two-wheeled vehicles. Iron, stainless steel, aluminum or an aluminum alloy is, however, preferred.

The spray coated layer is formed at least partly on the surface of the rim 1 with which the brake shoe is brought into contact. More specifically, it is formed on portions A and/or B of the rim surface as shown in FIGS. 2 to 4. It is formed on the rim of a front or rear wheel, or the rims of the two wheels, as the case may be.

The layer may be formed from a metal, such as Al, Ti, B, Cr, Mo, Ta, Fe, Si, W, Co, Ni, Zn or Y, or an alloy thereof. Alternatively, it may be formed from a ceramic material selected from among the oxides, nitrides, carbides or borides of those metals, etc. Specific examples of the metal oxides include $Al_2O_3$, gray alumina, $TiO_2$, $Cr_2O_3$, $SiO_2$, $ZrO_2$, $Y_2O_3$, MgO and CaO. Gray alumina is an oxide consisting mainly of $Al_2O_3$ and containing a small amount of $TiO_2$, etc. Specific examples of the metal nitrides include AlN, TiN, $Si_3N_4$, ZrN and BN. Specific examples of the metal carbides include TiC, SiC, WC, ZrC, $Cr_3C_2$ and $B_4C$. Specific examples of the metal borides include $TiB_2$, $ZrB_2$ and $MoB_2$. Alternatively, it may be a combined metal and ceramic layer. It may be formed from one or more of those metals (or alloys) and ceramic materials.

SHOCOAT, which is the tradename of a plasma coating material produced by SHOWA DENKO CO., LTD. of Japan, and a spray coating powder produced by DAIICHI METECO CO., LTD. of Japan are examples of the materials which can advantageously be used for the spray coating purpose of this invention.

For the purpose of this invention, it is particularly preferable to use a ceramic coating material or a coating material having a high ceramic content from the standpoint of wear resistance. It is desirable to use, among others, $Al_2O_3$, a composite of $Al_2O_3$ and $TiO_2$, gray alumina, $TiO_2$, WC, etc. There is no particular limitation to the shape of the coating material which can be used. It may be a powder, wire or rod, or any other shape suiting a device which is used for spraying it.

There is no particular limitation, either, to the method which can be used for spraying the material. It is possible to use, for example, a plasma, arc, gas flame or detonation spray coating method.

The spray coated layer may have a thickness of 20 to 300 microns. A thickness of 50 to 150 microns is preferred. If its thickness is too small, it fails to give the improved results for which this invention is intended. If its thickness is too large, it is likely to peel off the rim surface.

In the event that a ceramic material is used, it is possible to form a spray coated layer of improved adhesion if the ceramic material is sprayed onto the rim surface which has been undercoated with a metallic spray coating material. A composite of nickel and aluminum, nickel and chromium, or molybdenum, nickel and aluminum is a preferred undercoating material. The layer remains effective for a long period of time, as the ceramic material provides a high degree of wear resistance and its adhesion is improved by the underlying metallic material.

The spray coated layer gives a satin finish, i.e. an appearance of velvet texture to the rim surface. The roughness of the satinized rim surface (velvet appearance) depends on the blasting material which is used, its particle size, the blasting conditions, the particle size of the spray coating material which is used, and the spray coating conditions. The satinized rim surface may have an average roughness Ra of 2.0 to 12.0 micra. An Ra value of 2.0 to 5.0 micra is particularly preferred.

The spray coated layer may or may not have a polished surface. If it has a polished surface, it can more effectively prevent any wheel locking that would occur from an excessive braking action.

The surface of the spray coated layer usually has a considerably high degree of roughness which depends on the blasting material which is used, its particle size, the blasting conditions, the particle size of the spray coating material which is used, and the spray coating conditions. According to this invention, the layer is preferably polished until it has an average roughness Ra of 0.3 to 4.0 micra. An Ra range of, say, 2.0 to 3.5 micra is particularly preferred. Too smooth a surface fails to provide any satisfactorily improved coefficient of friction between the rim and the brake shoe when they are wet. Too coarse a surface gives rise to a wheel slip and is also likely to cause the heavy wear of the brake shoe.

The layer can be polished by any appropriate method without limitation in particular. For example, it is possible to polish it manually using abrasive cloth or paper, or a grindstone, formed from alumina, silicon carbide, diamond, etc. It is also possible to use a dry or wet polishing machine.

A corrosion inhibitor can be applied to the spray coated layer. A rust preventing agent or oil, a water repellent, etc. can be used as the corrosion inhibitor. The rust preventing agent may be selected from among either organic or inorganic compounds. Specific examples include a surface active agent, an activator of the amine series, an organic sulfur compound, sorbitan monooleate, a higher alcohol phosphoric ester, an imidazole derivative, a dicyclohexyl ammonium salt, a fatty acid salt of amine, calcium petroleum sulfonate and a phosphate. The rust preventing oil is a mixture of a rust preventing agent with oil or a solvent, such as spindle oil, paraffin oil or other mineral oil, or trichloroethane. A silicone or fluororesin can, for example, be used as the water repellent.

The satinized surface of the spray coated layer has projections which break any film of water formed between the rim and the brake shoe when they are wet, and thereby prevent any hydroplaning from occurring therebetween. Therefore, the rim and the brake shoe achieve therebetween an improved coefficient of friction which is close to what can be obtained when they are dry.

The spray coated surface of the rim can be polished to form a sliding surface having a multiplicity of projections which are sufficiently long to be capable of piercing through any film of water, while each projection has a very small flat area at its tip. The projections can break any film of water and thereby prevent any hydroplaning. As the projections on the polished surface are relatively short and have flat tips, the sliding surface of the brake shoe is brought into contact with water on the rim surface upon application of a braking force when the vehicle is exposed to water. The water gives rise to some reduction in coefficient of friction between the rim and the brake shoe. They show a coefficient of friction which is, say, 20 to 30% lower than what can be obtained when they are dry. This reduction is, however, so small that it is still possible to maintain an effective braking action, even though the wheel and the road surface may also have a lower coefficient of friction when the road surface is wet. Therefore, the same amount of braking force as that which is applied on a fine day can be applied even on a rainy day without resulting in any wheel slip. The wheel rim of this invention enables the effective performance of the braking system and thereby the prevention of any accident without requiring the driver of the vehicle to be unnecessarily nervous about the conditions of the road surface even on a rainy day.

The rim of this invention can be manufactured at a low cost, since the spray coating of its surface for satinizing it requires only a short time and a small amount of labor. The spray coated layer usually has a peeling strength of at least 300 kg/cm$^2$ and can, therefore, withstand a long period of use without causing any lowering in the performance of the braking system that would result from its chipping or peeling. It is particularly effective to use a ceramic material for forming the spray coated layer, since it can produce a satinized surface which can maintain a high degree of wear resistance for a long period of time. Moreover, the spray coated layer has a greatly improved corrosion resistance and does not form any rust, if it is coated or impregnated with a corrosion inhibitor.

Figure 5:
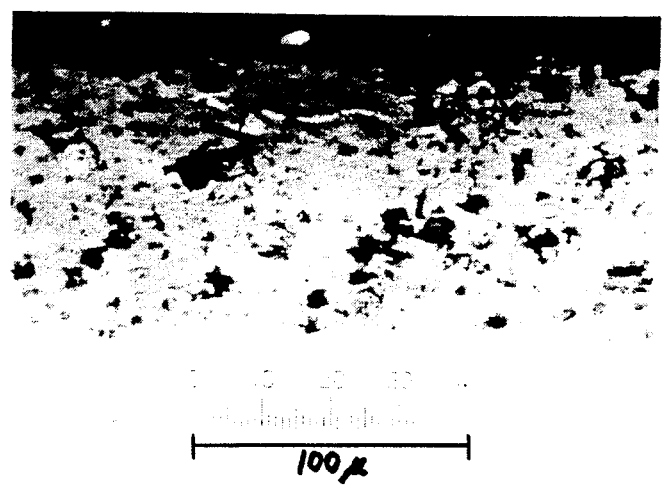
FIG. 5 is a microphotograph showing a cross section of a spray coated layer.

FIG. 5 is a microphotograph showing a cross section of a spray coated layer formed by employing gray alumina containing 96% of alumina and 2.3% of titania. As is obvious therefrom, the layer has pores. The porosity of a spray coated layer depends on the coating material and method which are employed, but is usually from 3 to 15%.

The invention will now be described more specifically with reference to several examples thereof which are not intended to limit the scope of this invention. The coefficient of friction appearing in the examples was determined by rotating a disk to which a brake shoe for a bicycle had been attached, placing thereon a disk of material to be tested, applying a load thereto, measuring the resulting force of friction, and dividing the force of friction by the load.

EXAMPLE 1

A sample was prepared by the plasma spray of an alloy of nickel and chromium to form an undercoat layer having a thickness of 20 micra on a disk of iron and by the plasma spray of a composite of alumina and titania to form an overcoat layer having a thickness of 60 micra on the undercoat layer. The sample showed a satinized surface having an average roughness Ra of 4.3 micra.

Table 1 shows the coefficient of friction which was measured between the sample and a brake shoe for a bicycle when they were wet, by an index number as compared with the value of 100 taken to indicate the coefficient of friction which was measured when they were dry. Table 1 shows the results obtained by applying three different amounts of pressure. The sample embodying this invention showed under wet conditions the coefficient of friction which was close to the value under dry conditions, irrespective of the pressure which had been applied. These results confirm that the rim of this invention contributes to giving an improved coefficient of friction under wet conditions.

COMPARATIVE EXAMPLE 1

A disk of iron was coated with an alloy of nickel and chromium as employed for coating a conventional wheel rim for a bicycle. The disk showed a mirror surface having an average roughness Ra of 0.2 micron.

In Table 1, index numbers of the coefficients of friction which were measured between the comparative sample and a brake shoe for a bicycle under wet and dry conditions should be compared. As is obvious therefrom, the comparative sample showed under wet conditions the coefficient of friction which was only 10 to 15% of the value under dry conditions. Therefore, it is obvious that the conventional rim gives a drastic reduction to the performance of the braking system under wet conditions.

TABLE 1

|  |  | Pressure (kg/cm$^2$) | | |
| --- | --- | --- | --- | --- |
|  | Conditions | 2 | 4 | 6 |
| EXAMPLE 1 | Dry | 100 | 100 | 100 |
|  | Wet | 91 | 102 | 107 |
| COMPARATIVE | Dry | 100 | 100 | 100 |
| EXAMPLE 1 | Wet | 13 | 10 | 15 |

EXAMPLE 2

An undercoat layer having a thickness of 20 micra was formed on the sides of an iron wheel rim for a bicycle by the plasma spray of an alloy of nickel and chromium and an overcoat layer having a thickness of 60 micra was formed thereon by the plasma spray of a composite of alumina and titania. The spray coated surface showed an average roughness Ra of 4.3 micra.

The rim was used to assemble a bicycle. The distances which were required for braking the bicycle were examined under both wet and dry conditions. Substantially the same results were obtained under both of the conditions. These results confirm that the spray coated ceramic layer on the rim according to this invention contributes to improving the performance of the braking system under wet conditions.

EXAMPLE 3

An undercoat layer having a thickness of 20 micra was formed on a disk of iron by the plasma spray of an alloy of nickel and chromium and an overcoat layer having a thickness of 60 micra was formed thereon by the plasma spray of a composite of alumina and titania. The spray coated surface showed an average roughness Ra of 4.3 micra. The surface was polished with a grindstone of green silicon carbide until it had an average roughness Ra of 1.5 micron.

Table 2 shows the coefficient of friction which was measured between the disk and a brake shoe for a bicycle under wet conditions, by an index number as compared with the value of 100 taken to indicate the coefficient of friction under dry conditions. The coefficient of friction was about 20 to 30% lower under wet conditions than the value under dry conditions. The values under wet conditions showed a slight reduction with an increase in the pressure (braking force) which had been applied. These results confirm that the rim of this invention contributes to improving the performance of the braking suytem under wet conditions.

TABLE 2

|  |  | Pressure (kg/cm$^2$) | | |
| --- | --- | --- | --- | --- |
|  | Conditions | 2 | 4 | 6 |
| EXAMPLE 3 | Dry | 100 | 100 | 100 |
|  | Wet | 78 | 76 | 74 |

EXAMPLE 4

An undercoat layer having a thickness of 20 micra was formed on the sides of an iron wheel rim for a bicycle by the plasma spray of an alloy of nickel and chromium and an overcoat layer having a thickness of 60 micra was formed thereon by the plasma spray of a composite of alumina and titania. The spray coated ceramic surface showed an average roughness Ra of 4.3 micra. The surface was polished with a grindstone of green silicon carbide until it had an average roughness Ra of 1.5 micron. It had a maximum roughness of 3 micra and a minimum roughness of 1 micron.

The rim was used to assemble a bicycle. It was subjected to a braking test under wet conditions. The results were compared with those which had been obtained from a rim having a spray coated surface not polished. A slightly longer distance was required for braking the bicycle including the rim having a spray coated and polished surface than for braking the bicycle including the rim having a spray coated surface not polished. Nevertheless, the results which had been obtained from the bicycle including the rim having a spray coated and polished surface were fully satisfactory from the standpoint of improved braking performance. There was, for example, no wheel slip. These results confirm that the rim of this invention contributes to improving the performance of the braking system under wet conditions.

EXAMPLE 5

A layer having a thickness of 100 micra was formed on the sides of a stainless steel wheel rim for a bicycle by the plasma spray of gray alumina containing 96% of alumina and 2.3% of titania. The surface of the spray coated layer showed an average roughness Ra of 4.3 micra. The surface was polished by a flap wheel until it had an average roughness Ra of 2.5 to 3.0 micra. A rust preventing oil was applied to the polished surface. The oil was the product of BRIDGESTONE CYCLE CO., LTD. of Japan known under the name "CYCLE FINISH". Its composition was as follows:

| | |
| --- | --- |
| 1,1,1-Trichloroethane | 30% by weight |

| -continued | | |
|---|---|---|
| Aliphatic hydrocarbon solvent | 40% | " |
| Paraffinic oil | 20% | " |
| Lubricant hydrocarbon | 5% | " |
| Organic inhibitor | 5% | " |

The oil penetrated through the pores in the spray coated layer and also covered the surfaces of the pores.

The rim was used to assemble a bicycle. It was subjected to a braking test under wet conditions. The results were compared with those which had been obtained from an ordinary stainless steel rim not having any spray coated surface. The distance which was required for braking the bicycle including the rim having a spray coated surface was one-fourth of that which was required for braking the bicycle including the ordinary rim. These results confirm that the rim of this invention contributes to improving the performance of the braking system under wet conditions.

The rim embodying this invention was subjected to a CASS corrosion test according to the JIS H8502 method. No rust appeared until at least 48 hours after the test had been started.

What is claimed is:

1. A wheel rim for a bicycle with a brake shoe comprising a rim made of one of aluminum and stainless, and a layer directly spray-coated on the rim at a portion where the brake shoe contacts when stopping rotation of the wheel, said layer being formed of only ceramic materials and having a polished surface, the average roughness being 2.0-3.5 micra.

2. A rim as set forth in claim 1, wherein said layer is composed of a material selected from the group consisting of $Al_2O_3$, a composite of $Al_2O_3$ and $TiO_2$, $TiO_2$ and WC.

3. A rim as set forth in claim 1, wherein said layer is coated with a corrosion inhibitor.

4. A rim as set forth in claim 3, wherein said corrosion inhibitor is selected from among a rust preventing agent, a rust preventing oil and a water repellent.

5. A wheel rim for a bicycle with a brake shoe, comprising, a rim, a layer spray coated on the rim at a portion where the brake shoe contacts when stopping rotation of the wheel, said layer including an outer layer formed of ceramic material selected from the group consisting of $Al_2O_3$, a composite of $Al_2O_3$ and $TiO_2$, $TiO_2$ and WC, said outer layer being directly spray-coated on the rim to have thickness from 50 to 150 micra and then polished so that an average roughness is between 2.0 and 3.5 micra, whereby wheel locking due to excessive braking action and an excessive wear of the brake shoe are prevented, and a corrosion inhibitor applied on the outer layer to prevent rust of the wheel rim, said corrosion inhibitor being selected from a group consisting of a rust preventing agent, a rust preventing oil and a water repellent.

* * * * *